United States Patent

[11] 3,621,130

| [72] | Inventors | T. O. Paine<br>Administration of the National Aeronautics and Space Administration with respect to an invention of;<br>Nazem A. Habbal, Hollywood, Calif. |
|---|---|---|
| [21] | Appl. No. | 878,730 |
| [22] | Filed | Nov. 21, 1969 |
| [45] | Patented | Nov. 16, 1971 |

[54] SYSTEM FOR QUANTIZING GRAPHIC DISPLAYS
5 Claims, 2 Drawing Figs.

[52] U.S. Cl. .................................................. 178/7.2 R, 178/6.8, 178/DIG. 28, 178/DIG. 36
[51] Int. Cl. .................................................. H04m 3/16
[50] Field of Search .......................................... 178/DIG. 28, 6.8, DIG. 1, DIG. 21

[56] References Cited
UNITED STATES PATENTS

| 3,175,089 | 3/1965 | Talley et al. .................. | 178/6.8 |
| 3,243,509 | 3/1966 | Stut .............................. | 178/6 |
| 3,261,967 | 7/1966 | Rosin et al. .................. | 178/6 |
| 3,449,511 | 6/1969 | Hecker ......................... | 178/6 |
| 3,328,523 | 6/1967 | Treseder et al. .............. | 178/6.8 |

Primary Examiner—Robert L. Griffin
Assistant Examiner—Donald E. Stout
Attorneys—J. H. Warden, Monte F. Mott and G. T. McCoy ABSTRACT: A system for digitizing a graphic display to determine the position and orientation of objects depicted thereon is disclosed. The display is provided with a reference coordinate framework. A detection apparatus scans the display in a line-by-line manner. A counter is initiated when each line scan intersects a first reference line of the coordinate framework and normally continues to count until the scan intersects a second reference line. If there is an "image" portion between the counter "start" and counter "stop" reference lines, however, then the count is terminated when the scan intersects the leading edge of the image.

The counter values from each line scan are stored in a computer memory. Since the linear speed of each scan relative to the counting rate is known, information relating to the image distance above the start reference line is obtained. Information as to the image position in the orthogonal coordinate is obtained by counting the number of scans of known separation from a reference line segment to the point where the reference scan intersects the portion of interest.

PATENTED NOV 16 1971      3,621,130

INVENTOR.
NAZEM A. HABBAL
BY
J. N. Warden

ATTORNEYS

SYSTEM FOR QUANTIZING GRAPHIC DISPLAYS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to data acquisition systems and more particularly to a system for rapidly digitizing a graphic display to obtain position and orientation information of objects represented therein.

2. Description of the Prior Art

Systems for digitizing graphic displays to acquire data concerning the nature of objects depicted by such displays are known. These systems find use in areas such as analyzing the motion of airfoil models as depicted in sequential high-speed movie frames wherein it is required on each frame to determine the position and directional orientation of the model. Comparison of successive frames provides a time history account of the object motion therein depicted. Because of the large number of individual displays required to be studied, computer analysis is desirable.

Known systems typically generate the required digital data by utilizing a flying spot-scanner. The flying spot-scanner is caused to scan each individual display in a line by line manner. Each scan line is segmented into a large number of differential line components. Quantized output level readings for each individual line component are stored in an associated memory. The procedure is continued until an entire graphic display is thus scanned and digitized after which the next sequential display is positioned and similarly scanned.

The associated storage memory is thus provided with a quantized representation of each differential line component on each graphic display. The stored information is then manipulated by suitable data processing procedures to determine the display information required.

While the above approach is capable of providing the required digitized information, it has several serious disadvantages. First, since each display is segmented into a large number of differential line segments, the amount of computer memory capacity required to quantize each display is enormous. In addition, the computer must process a tremendous amount of information to obtain the required results. Still further, the time required to so quantize and process the raw information is undesirably long.

OBJECTS AND SUMMARY OF THE INVENTION

The data acquisition system of the present invention overcomes the above-noted difficulties. In accordance with the present invention a detection apparatus such as a TV camera scans the graphic display in a line by line manner. The display is provided with a reference coordinate framework. The detection apparatus is capable of providing a detection signal indication when it "sees" a portion of the graphically displayed configuration.

A counter is initiated when each line scan intersects a first reference line of the coordinate framework and normally continues to count until the scan intersects a second reference line. The counter is stepped by constant frequency clock pulses. If there is an "image" portion between the counter "start" and the counter "stop" reference lines (for a given line scan), however, then the count is terminated when the scan intersects the leading edge of the image. The counter values from each line scan are stored in a computer memory. The line-by-line scan and storage of the counter values for each individual line scan is continued for the entire width of the display.

Since the lineal speed of each scan relative to the counting rate is known, information relating to the image distance above the counter "start" reference line is thereby obtained. Information as to the image position in the orthogonal coordinate is obtained by counting the number of scans of known separation from a reference mark to the point where the scan intersects the image portion of interest.

Since the scanning technique requires storage of only one counter reading per scan line, the total memory capacity required for data storage of each display is significantly reduced over prior techniques. In addition the remainder of the memory heretofore required for data storage is made available for program storage and for more sophisticated data handling purposes. Further, the time required to quantize and data process each display is significantly reduced.

It is therefore an object of this invention to provide a high-speed graphic display data acquisition system.

It is another object of the present invention to provide a data acquisition system having reduced memory storage requirements.

It is a further object of the present invention to provide a data acquisition system capable of rapidly quantizing a graphic display to obtain position and orientation information.

Still other objects, features and attendant advantages of the present invention will become apparent to those skilled in the art from a reading of the following detailed description of several embodiments constructed in accordance therewith, taken in conjunction with the accompanying drawings, and wherein:

DESCRIPTION OF THE PREFERRED EMBODIMENT

Figure 1:
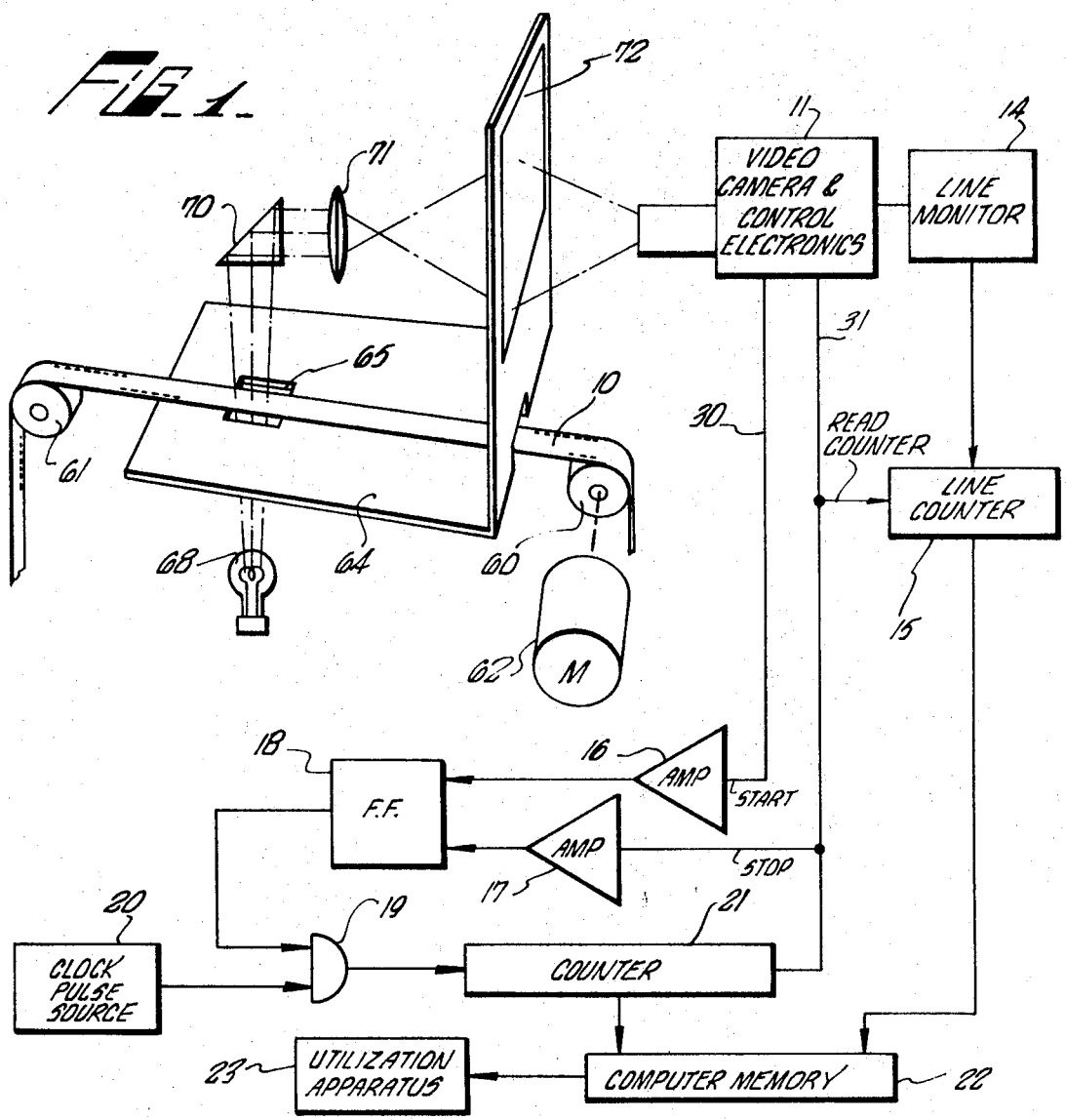
FIG. 1 is a schematic and block diagram of one embodiment of a data acquisition system constructed in accordance with the principles of the present invention.

Referring now to FIG. 1, there is shown an exemplary data acquisition system constructed in accordance with the principles of the present invention.

In the embodiment of FIG. 1, the graphic display to be quantized constitutes images recorded on successively arranged frames of a motion picture film 10. It is required to determine the position and orientation of an object as depicted by the images on successive frames. Comparison of position and orientation changes between frames provides a history of the original motion of the object photographed.

Film 10 is moved past a projection housing 64 by a capstan 60 driven by controllable motor 62. Light from a source 68 is projected through an aperture 65 in the housing 64 for the purpose of projecting the image recorded on successive frames of the film 10, a reflector 70 and a focusing lens 71 are employed to direct the projected light image onto a display screen 72.

The image thus projected on display screen 72 is scanned in a line-by-line manner by video camera and control electronics 11 which is disposed in optical communication with the display screen.

The data acquisition apparatus of the present invention will now be described having additional reference to FIG. 2 wherein there is shown a graphic representation of one film frame of an exemplary conical model 100 wherein it is desired to quantize the display to determine the position and orientation of the model.

Figure 2:
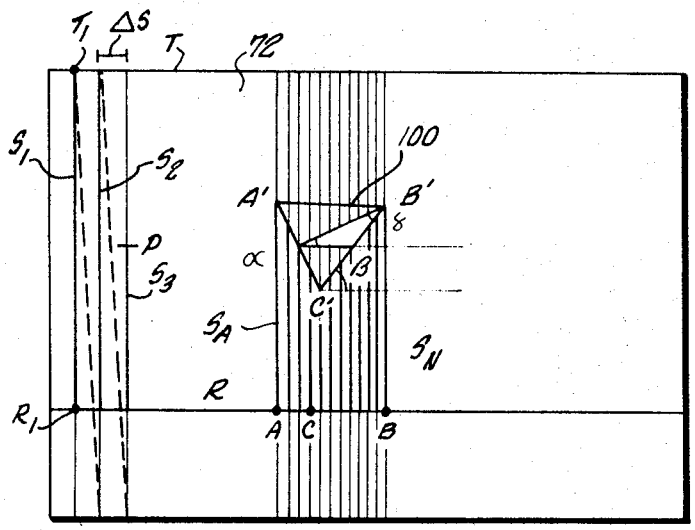
FIG. 2 is a representation of a typical graphic display and is useful in understanding the operation of the embodiment of FIG. 1.

As shown in FIG. 2, the graphic display is provided with a reference framework comprising reference line R and reference line segment P. Line segment P is preferably parallel to line R and of a length equal to at least one scanning line interval $\Delta S$ (shown in expanded scale) to assure that the line segment will be intersected at least once each frame scan.

The reference framework thus described may be provided in a variety of ways. Preferably it is applied directly to each film frame so that the field of view of each frame relative to the reference framework is a constant. Alternatively, it may be provided by positioning a reference overlay on display screen 72. As yet another alternative, it may be programmed into the video scanning electronics.

Referring now to FIGS. 1 and 2 in more detail, as the first scan line $S_1$ of video camera and control electronics 11 traverses the display surface 72, it intersects the reference line R at point $R_1$. A reference video signal is generated by camera 11 and appears on line 30, FIG. 1. Upon amplification by amplifier 16 the reference video signal is used to set a flip-flop 18. Flip-flop 18 when set enables AND-gate 19. The control electronics assures that flip-flop 18 is in a reset condition at the start of each scan line.

AND-gate 19 when enabled applies constant frequency clock pulses, provided by a clock pulse source 20, to a counter 21. Counter 21 continues to count the supplied clock pulses until either the scan intersects an intermediately disposed graphic image or the scan reaches an end of scan line T.

Referring to exemplary scan $S_1$, as the scan intersects reference line T at $T_1$, a second video signal is generated by TV camera 11. The second generated video signal appears on line 31. After amplification by amplifier 17 it is used to reset flip-flop 18. Flip-flop 18 when reset, ceases to apply an enabling signal to the AND-gate 19. Clock pulses from the clock source 20 are accordingly no longer applied to the counter 31 and the counting operation is stopped.

The signal appearing on line 31 is also used as a "Read Counter" pulse to cause the counter reading to be read into computer memory 22 and to cause the counter 21 to be reset for the next scan.

AT scan $S_3$ the scan intersects reference line P. The video signal thus generated serves as the second generated video signal thus stopping the counting operation. The control electronics assures that flip-flop 18 once reset remains in that condition for the remainder of the individual line scan in progress ($S_3$ in this case). Since the position of reference line segment P relative to reference line R is known, computer memory 22 is, in the above-described manner, provided with a counter value which is readily identified as corresponding to the scan which intersected the reference line P. Since the scan intervals Δ S are known a ready means of thereafter measuring along the reference line R is provided.

The scanning process is continued in a line-by-line manner, as shown. Eventually the scanning process progresses to scan line $S_A$. In the manner as previously described, the counter is started at A and stopped at A' (the leading edge of the graphic representation).

Since the pulse rate of clock pulse source 20 is known as well as the line scanning rate, the value stored in the counter at the time it stops counting is therefore proportional to the amplitude of the line AA'.

The above process is repeated until the entire width of the frame 72 is scanned. Consequently, at the end of the scanning of a frame, the computer memory 22 has stored therein the digitized values of the points on lines A'C' and C'B'.

The orientation angle B of the graphically represented cone can be readily computed from the equation $$tan B = BB' - CC'/CB \qquad (1)$$

The values of $BB'$ and $CC'$ are already available in the memory 22. The value of $CB$ is readily obtained by simply counting the number of scan segments Δ S from $CC'$ to $BB'$.

In the embodiment of FIG. 1, a line monitor 14 provides an output pulse to line counter 15 each time a new line scan is initiated. The scan line number in counter 15 is strobed into the computer memory 22 at the same time as each line value count from counter 21 by the flip-flop reset pulse on line 31.

There is therefore associated in memory 22 a scan number for each counter 21 value which may readily be related to the image position along reference line R. The position of A' relative to the reference framework, for example, is obtained by counting the number of scan lines from the reference line segment P to scan line $S_A$.

The above procedure may be used to determine the two-dimensional position and orientation of any graphic representation. However, the above technique may be readily modifiable to provide three or more dimensional information. For example, if three-dimensional coordinate position and orientation information is desired, the object of interest would be simultaneously photographed from two separate angles relative to some reference plane. Each individual photographic picture would be read in the above indicated manner to provide two two-coordinate representations which by standard transformation techniques provides the required three-dimensional coordinate position and orientation information.

The digitizing apparatus of the present invention thus rapidly and efficiently generates the required information relating to any graphic display.

What is claimed is:

1. A system for quantizing graphic displays including a line image, said system comprising:

display means for presenting said line image in a format including a pair of orthogonal rectangular coordinates, and first and second reference lines positioned along opposing edges of said graphic display, said reference lines being parallel to each other and to a first one of said coordinates;

scanning means for scanning said graphic display to provide scan signals, said scanning including a plurality of traversals across said graphic display, said traversals successively following a pattern of contiguous scan lines that are parallel to a second one of said coordinates;

data means responsive to said scan signals for providing data signals representative of distances measured along successive scan lines from said first reference line to points on a line image where intersected by said scan lines; and storage means responsive to said data means for storing said data signals wherein data signals are applied to said storage means subsequent to each of said traversals of said scanning means across said graphic display.

2. The apparatus defined by claim 1 wherein said data means includes:

bistable means responsive to said scan signals for providing an enabling signal for at least a portion of each traversal, said enabling signal being commenced during each traversal in response to said scanning means traversing said first reference line and being terminated in response to said scanning means traversing said line image or said second reference line in the absence of a line image;

clock means responsive to said enabling signals for providing a succession of clock pulse signals; and counter means responsive to said clock pulse signals for providing said data signals.

3. The apparatus defined by claim 2 wherein said data means further includes:

monitor means connected to said scanning means for detecting each successive traversal; and means connected to said monitor means for relating each traversal with respect to other traversals of a graphic display.

4. The apparatus defined by claim 1 wherein said display means includes:

a transparency having said graphic display recorded thereon; and means for providing an enlarged projected image of said graphic display including a projection screen, a source of light adapted to be juxtaposed to said transparency to provide a light image of said graphic display, and an optical system for projecting said light image onto said projection screen to develop said enlarged projected image.

5. The apparatus defined by claim 3 wherein said display means includes:

a transparency having said graphic display recorded thereon; and means for providing an enlarged projected image of said graphic display including a projection screen, a source of light adapted to be juxtaposed to said transparency to provide a light image of said graphic display, and an optical system for projecting said light image onto said projection screen to develop said enlarged projected image.

* * * * *